United States Patent [19]
Tanaka et al.

[11] Patent Number: 5,581,232
[45] Date of Patent: Dec. 3, 1996

[54] ULTRASONIC WAVE RECEPTION APPARATUS AND OBSTACLE DETECTION APPARATUS

[75] Inventors: Takashi Tanaka, Toyoake; Masashi Tanaka, Osaka; Yoichi Taniguchi, Okazaki; Shigeru Ito, Nagoya, all of Japan

[73] Assignee: Mitsubishi Jidosha Kogyo Kabushiki Kaisha, Tokyo, Japan

[21] Appl. No.: 77,639

[22] Filed: Jun. 17, 1993

[30] Foreign Application Priority Data

Jun. 18, 1992 [JP] Japan .................................. 4-159012

[51] Int. Cl.$^6$ .................................................. B60Q 1/00
[52] U.S. Cl. ........................ 340/435; 340/903; 340/943; 340/436; 280/734; 180/167; 180/169; 367/93; 367/94; 338/114; 338/13; 338/15; 338/18
[58] Field of Search .................................... 340/903, 943, 340/436, 435; 280/734, 735; 367/90–94; 338/13, 15, 18, 114; 180/167, 169

[56] References Cited

U.S. PATENT DOCUMENTS

| | | | |
|---|---|---|---|
| 2,443,471 | 6/1948 | Mason | 333/187 |
| 2,964,272 | 12/1960 | Olson | 248/550 |
| 3,464,657 | 9/1969 | Bullard | 248/550 |
| 3,703,999 | 11/1972 | Forys et al. | 248/550 |
| 4,142,074 | 2/1979 | Corbett | 179/124 |
| 4,674,073 | 6/1987 | Naruse | 367/105 |
| 4,795,123 | 1/1989 | Forward et al. | 248/550 |
| 4,849,668 | 7/1989 | Crawley et al. | 310/328 |
| 5,261,505 | 11/1993 | Holrogel et al. | 340/436 |

FOREIGN PATENT DOCUMENTS

| | | |
|---|---|---|
| 9004394 | 9/1990 | Germany . |
| 62-51061 | 3/1987 | Japan . |
| 63-69654 | 5/1988 | Japan . |

*Primary Examiner*—John K. Peng
*Assistant Examiner*—Daryl C. Pope

[57] ABSTRACT

An obstacle detection apparatus includes a rubber-like elastic body interspersed with electroconductive particles, and means for applying a voltage to the rubber-like elastic body to obtain an ultrasonic wave reception signal from a change in electrical resistance of the elastic body. An ultrasonic wave transmission apparatus is mounted on a support member for transmitting an ultrasonic wave outward. The rubber-like elastic body interspersed with electroconductive particles is provided along an outer periphery of the support member, and a voltage is applied to the rubber-like elastic body to obtain an ultrasonic wave reception signal from a change in electrical resistance of the elastic body as a result of receiving the ultrasonic wave reflected from an obstacle.

40 Claims, 13 Drawing Sheets

RECEPTION OF 175KHz PULSE WAVE

TRANSMITTER POSITION FIXED

TRANSMITTER MOVING AT CONSTANT SPEED (DOPPLER EFFECT)

TRAVELING SIDE BY SIDE

BEFORE SIDE COLLISION

60 WHEEL HOUSE MOLDING

1 AUTOMOBILE

...

ULTRASONIC WAVE RECEPTION APPARATUS AND OBSTACLE DETECTION APPARATUS

FIELD OF THE INVENTION

This invention relates to an ultrasonic wave reception apparatus and an obstacle detection apparatus utilizing the same.

BACKGROUND OF THE INVENTION

As shown in FIG. 13, it is known to provide an automobile 1 with an obstacle detection apparatus which has a case 2 containing an ultrasonic wave transmitter and a receiver disposed at a corner part 3 of the vehicle body for preventing collision at the corner during garaging or the like. An ultrasonic wave 4 is transmitted from the corner part 3 and its reflection wave 5 is received to determine the distance from the corner part 3 to an obstacle 6 based upon the delay time from the transmission to the reception and notify the driver of the distance. An piezoelectric element is used for the transmission and reception of the ultrasonic wave. In this case, since an ultrasonic wave is a compression wave of air, the piezoelectric element receives the compression wave to produce a deformation, and the deformation generates an electromotive force by the piezoelectric effect of the element. When a piezoelectric element is used as an ultrasonic wave reception sensor, since the piezoelectric element itself has a natural frequency, and it is necessary to select a specific resonance frequency region by selecting its material, size, and shape in order to improve the sensitivity, it is difficult to receive ultrasonic wave 5 over a wide frequency region. Furthermore, the transmitter and the receiver have a substantial directional dependency.

The above-described prior art obstacle detection apparatus is effective for preventing collision of the corner part 3. However, as shown in FIG. 14, when an obstacle, for example, another automobile 7, is present at the right or left of the automobile 1, it may sometimes be impossible to receive the reflection wave 5 and detect the other vehicle 7. To prevent such a problem, it has been considered to provide the transmitter and receiver not only at the corner part 3, but as disclosed in Japanese Utility Model Laid-open Publication 63-69654, a number of the devices may be provided over the entire periphery of the vehicle. However, this results in large parts cost and installation cost. Furthermore, even if the piezoelectric element is increased in length to expand the reception zone, the resonance frequency is decreased to the extent, and not resonant with nor receive the ultrasonic wave, which is not practical.

Furthermore, the danger of collision with an obstacle depends not only on the distance but also on the relative velocity with the obstacle. However, with the prior art obstacle detection apparatus, which uses a piezoelectric element, it is difficult to measure the relative velocity. Specifically, even if the Doppler effect is used to measure a relative velocity, the frequency of the reflection wave may be out of the resonance frequency of the reception piezoelectric element, and the reflection wave is not detected.

SUMMARY OF THE INVENTION

With a view to eliminate such prior art defects, a primary object of the present invention is to provide an apparatus which is able to receive an ultrasonic wave without being affected by a change in frequency and therefore receive an ultrasonic wave in all directions.

In accordance with the present invention, there is provided an ultrasonic wave reception apparatus comprising a rubber-like elastic body interspersed with electroconductive particles, and conversion means for applying a voltage to the rubber-like elastic body to obtain an ultrasonic wave reception signal from a change in electrical resistance. The electroconductive particles interspersed in the rubber-like elastic body vibrate and undergo relative dislocation due to the vibration of the ultrasonic wave, which leads to a change in electrical resistance characteristics of the rubber-like elastic body. When a voltage is applied to the rubber-like elastic body, an electrical signal varying according to a change in electrical resistance is obtained, and the electrical signal varies with the ultrasonic vibration. The rubber-like elastic body utilizes the changes in electrical resistance characteristics due to relative dislocation between the electroconductive particles interspersed therein, and is therefore not affected by a particular natural frequency as typically seen in a piezoelectric element, and thereby receives the ultrasonic wave over a wide frequency range without being affected by the size and shape of the element. For example, a relatively long-sized rubber-like elastic body can receive an ultrasonic wave. Furthermore, reception is also possible even if the frequency varies due to the Doppler effect.

It is preferable to provide the rubber-like elastic body along an outer periphery almost over the entire periphery of its support member. This enables the ultrasonic wave to be received from any direction without disturbance by the support member. Furthermore, the electroconductive particles are preferably carbon short fibers of 0.01 to 0.02 mm in diameter and less than 1 mm in length, or carbon particles of 0.01 to 0.1 mm in diameter, contained in an amount of 25% to 60% by weight based on the total weight of the rubber-like elastic body. In this case, a sufficient conductivity and a sufficient strength of the rubber-like elastic body can be achieved.

There is also provided according to the present invention an obstacle detection apparatus comprising an ultrasonic wave transmission apparatus mounted on a support member for transmitting an ultrasonic wave outward, a rubber-like elastic body interspersed with electroconductive particles provided on an outer surface of the support member, and conversion means for applying a voltage to the rubber-like elastic body to obtain an ultrasonic wave reception signal from a change in electrical resistance. According to the invention, an ultrasonic wave is transmitted outward, and its reflection wave is received by the rubber-like elastic body, which converts the wave to an electrical signal to detect an obstacle.

The obstacle detection apparatus is provided with distance calculation means for calculating a distance to a reflective body from a difference between the time at which the ultrasonic wave is transmitted from the ultrasonic wave transmission apparatus and the time at which the wave is received by the rubber-like elastic body. In this case, the distance between the support member and the reflective body is calculated from the difference in time between transmission and reception of the ultrasonic wave.

The obstacle detection apparatus further comprises relative velocity calculation means for calculating a relative velocity between the support member and the reflective body from a difference in frequency between the ultrasonic wave transmitted from the transmission apparatus and the ultrasonic wave received by the rubber-like elastic body. The obstacle detection apparatus may also include collision time calculation means for calculating a time to collision of the support member with the reflective body from the relative velocity and the distance calculated by the distance calculation means. In this case, utilizing the Doppler effect, a relative velocity between the support member and the reflective body is calculated from a difference in frequency between the transmitted ultrasonic wave and the received ultrasonic wave, and a time to collision is calculated from the relative velocity and the distance.

There is further provided according to the present invention another obstacle detection apparatus comprising an ultrasonic wave transmission apparatus mounted on a vehicle for transmitting an ultrasonic wave outward, a rubber-like elastic body interspersed with electroconductive particles provided on an outer surface of the vehicle, and conversion means for applying a voltage to the rubber-like elastic body to obtain an ultrasonic wave reception signal from a change in electrical resistance. In this case, an ultrasonic wave is transmitted outward, and its reflection wave is received by the rubber-like elastic body, which wave is converted to an electrical signal to detect an obstacle.

The obstacle detection apparatus is provided with distance calculation means for calculating a distance to a reflective body from a difference between the time at which the ultrasonic wave is transmitted from the ultrasonic wave transmission apparatus and the time at which the wave is received by the rubber-like elastic body. In this case, the distance between the vehicle and the reflective body is calculated from the difference in time between transmission and reception of the ultrasonic wave.

The obstacle detection apparatus further comprises relative velocity calculation means for calculating a relative velocity between the vehicle and the reflective body from a difference in frequency between the ultrasonic wave transmitted from the transmission apparatus and the ultrasonic wave received by the rubber-like elastic body. The apparatus may also include collision time calculation means for calculating a time to collision of the vehicle with the reflective body from the relative velocity and the distance calculated by the distance calculation means. In this case, utilizing the Doppler effect, a relative velocity between the vehicle and the reflective body is calculated from a difference in frequency between the transmitted ultrasonic wave and the received ultrasonic wave, and a time to collision is calculated from the relative velocity and the distance.

The rubber-like elastic body may be provided on the entire outer periphery of the vehicle or at a selected portion of the outer surface of the vehicle. Furthermore, the rubber-like elastic body may be mounted on an indicator provided on the roof. A selected portion of the outer surface of the vehicle is preferably at least one of the front and rear bumpers, doors, wheel arches, fenders, and body panels of the vehicle. Furthermore, portions of the rubber-like elastic body can be electrically connected in series or parallel. The ultrasonic wave can be received from all directions when the rubber-like elastic body is provided over the entire outer periphery of the vehicle body, or the ultrasonic wave from a selected zone can be received when the rubber-like elastic body is provided at a selected position. Even when the rubber-like elastic body is provided in segments in selected portions, it can satisfactorily receive the ultrasonic wave by connecting the segments or pieces electrically in series. Alternatively, the pieces may be electrically connected in parallel and the individual pieces be applied with a voltage. All of the ultrasonic wave reception signals can be processed by a single obstacle detection apparatus.

The ultrasonic wave transmitters may be attached to the four individual corner parts, or a single transmitter may be mounted on the roof of the vehicle. In this cases, a single non-directional ultrasonic wave transmitter can be provided on the roof, or directional ultrasonic wave transmission means can be provided at four corner parts of the vehicle, to transmit and receive the ultrasonic wave over the entire outer periphery of the vehicle body.

Furthermore, in a preferred embodiment, the invention includes air bag operation instruction means for operating an air bag when the time to collision calculated by the collision time calculation means is less than a predetermined value. Alternatively, the invention may include air bag operation permission means for permitting the operation of the air bag only when the relative velocity calculated by the relative velocity calculation means is greater than a predetermined value. Another feature of the invention comprises warning means for giving different warnings according to the time to collision calculated by the collision time calculation means. In these cases, since, when the support member is a vehicle, it is difficult to avoid collision if the time to collision is short, the air bag is operated to protect the passenger. The air bag is operated only when the relative velocity is high, and the air bag is not operated since the shock is very small when the relative velocity is low. Furthermore, different warnings are given according to the time to collision to attract the driver's attention.

Another obstacle detection apparatus according to the present invention comprises an ultrasonic wave transmission apparatus mounted on the vehicle for transmitting an ultrasonic wave outward, a molding formed of a rubber-like elastic body interspersed with electroconductive particles, and conversion means for applying a voltage to the rubber-like elastic body of the molding to obtain an ultrasonic wave reception signal from a change in electrical resistance.

In this case, an existing molding can also be used as the rubber-like elastic body, thereby eliminating the need for a new place for the rubber-like elastic body.

The molding may be a side protect molding or a bumper molding of the vehicle.

As described above, with the present invention, it is possible to provide an apparatus which can receive ultrasonic waves without being affected by the resonance frequency and even in the presence of the Doppler effect. The apparatus can be provided with a desired size necessary for a desired range, and may be an apparatus which can detect an obstacle in all directions. Furthermore, since the present invention can accurately detect an approaching obstacle, it remarkably improves safety when used for the vehicle. In particular, an air bag is practically of no use if the air bag is opened after a collision. However, with the present invention, the air bag can be previously operated to reduce injury to the passenger.

DESCRIPTION OF PREFERRED EMBODIMENTS

Figure 1:
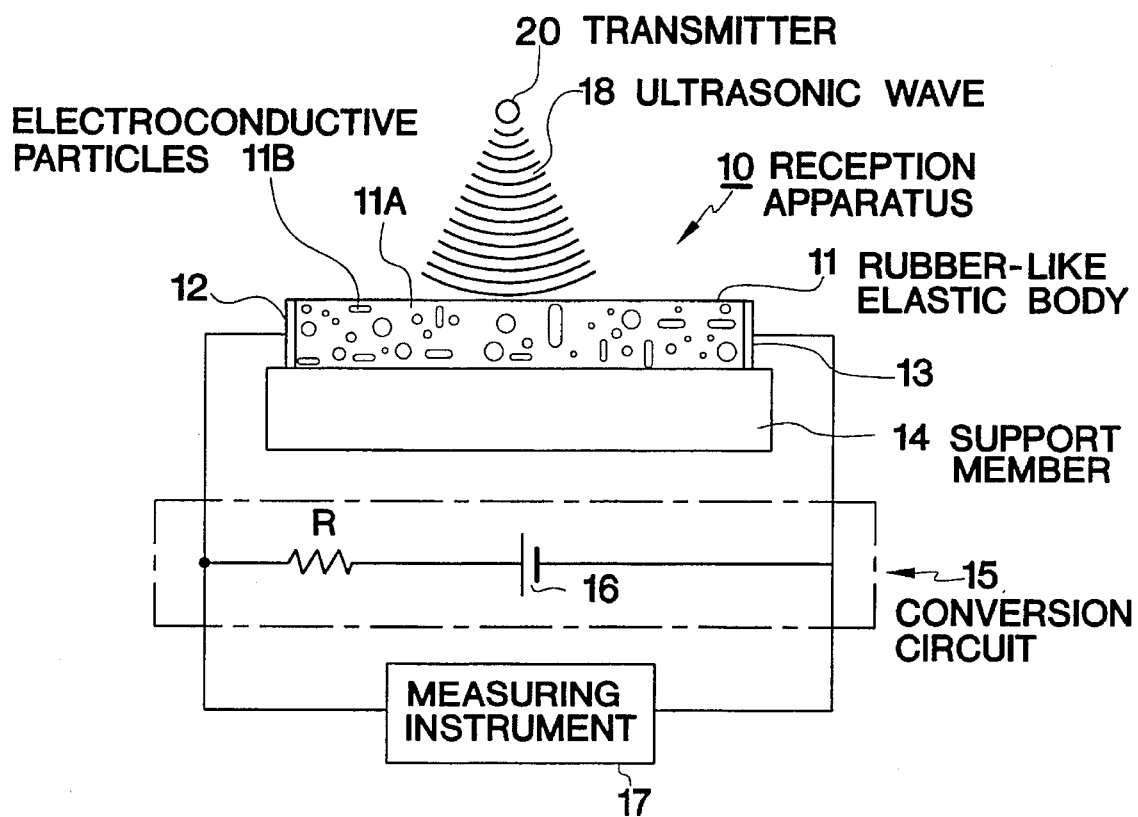
FIG. 1 is a schematic view showing an arrangement of a basic embodiment of the ultrasonic wave reception apparatus according to the present invention.

Preferred embodiments of the present invention will be described with reference to the drawings. FIG. 1 shows the basic structure of an ultrasonic wave reception apparatus 10. Referring to FIG. 1, a rubber-like elastic body 11 is formed of a substance 11A having a rubber elasticity, including elastic rubber or rubber-like substances such as synthetic rubber, plastics, or resins, interspersed with electroconductive particles 11B. The electroconductive particles 11B include short fibers, for example, carbon and metal particles of silver, copper, or the like. The content of the electroconductive particles 11B may be such that both the electroconductivity and the rubber strength are assured. For example, when carbon is used, the content is preferably 25% to 60% by weight. That is, a content of less than 25% by weight results in a low electroconductivity, and a content exceeding 60% by weight results in a low rubber strength. The shape of the carbon particles can be particles of 0.01 to 0.1 mm in diameter, or fibers of 0.01 to 0.02 in diameter and less than 1 mm in length.

Figure 2A:
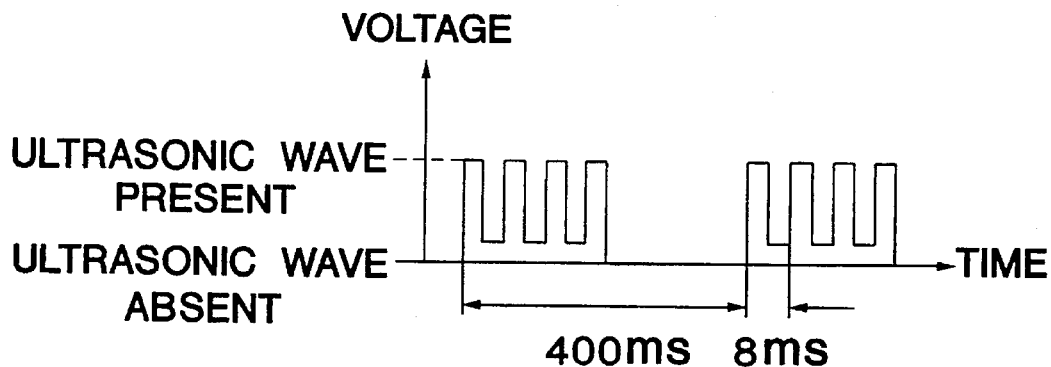
FIG. 2(a) is a diagram showing a waveform example of ultrasonic wave reception.
Figure 2B:
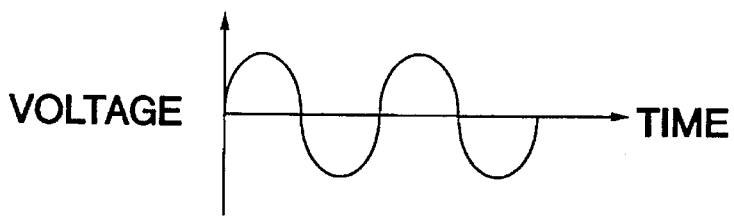
FIG. 2(b) is a diagram showing a waveform example when an ultrasonic wave from a fixed position is received.
Figure 2C:
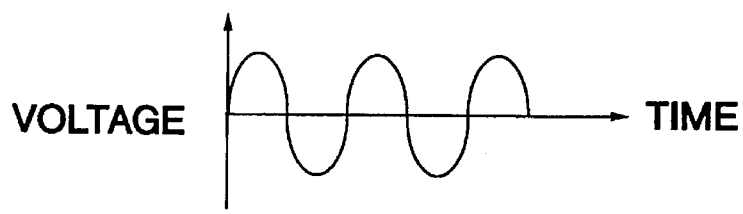
FIG. 2(c) is a diagram showing a waveform example when an ultrasonic wave from an object approaching at a constant speed is received.

In FIG. 1, electrodes 12 and 13 are formed at both ends of an elongated rubber-like elastic body 11 with a thickness of 0.5 to 1.0 mm. The elastic body is mounted on an insulating support member 14, and a DC power supply 16 is connected as a conversion circuit 15 between the electrodes 12 and 13 through a resistor R. A measuring instrument 17 such as an oscilloscope is connected between the electrodes 12 and 13. When an ultrasonic wave 18 is applied, a waveform as shown in FIG. 2(a) is observed, and the ultrasonic wave 18 could be received. The ultrasonic wave 18 in this case is a 175 KHz pulse wave. When observation was carried out for cases where a transmitter 20 of the ultrasonic wave 18 was placed at a constant position, and where the transmitter was approached at a constant speed, increases in frequency due to the Doppler effect as shown in FIG. 2(b) and FIG. 2(c), respectively, could be observed. The resistor R in FIG. 1 is not always necessary if the internal resistance of the power supply 16 is high to some extent. Furthermore, not only a voltage, but also a current can be used as detection means since it is vibrated with the ultrasonic wave 18.

Figure 3:
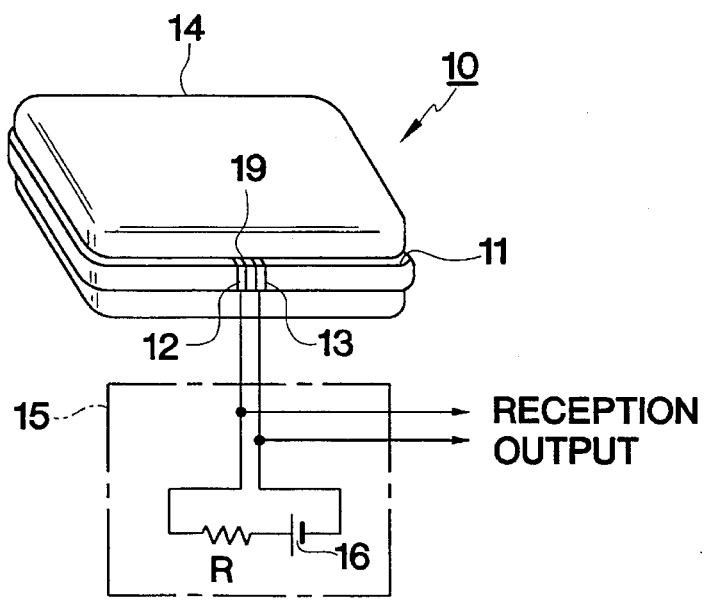
FIG. 3 is a schematic view showing an embodiment of the ultrasonic wave reception apparatus of the invention.

FIG. 3 shows an embodiment wherein the rubber-like elastic body 11 is provided one fully turn around the outer periphery of the support member 14 so that reception is possible from anywhere in 360° around the support member 14, and an insulating material 19 is disposed between the electrodes 12 and 13. The numeral 15 indicates a conversion circuit.

Figure 4:
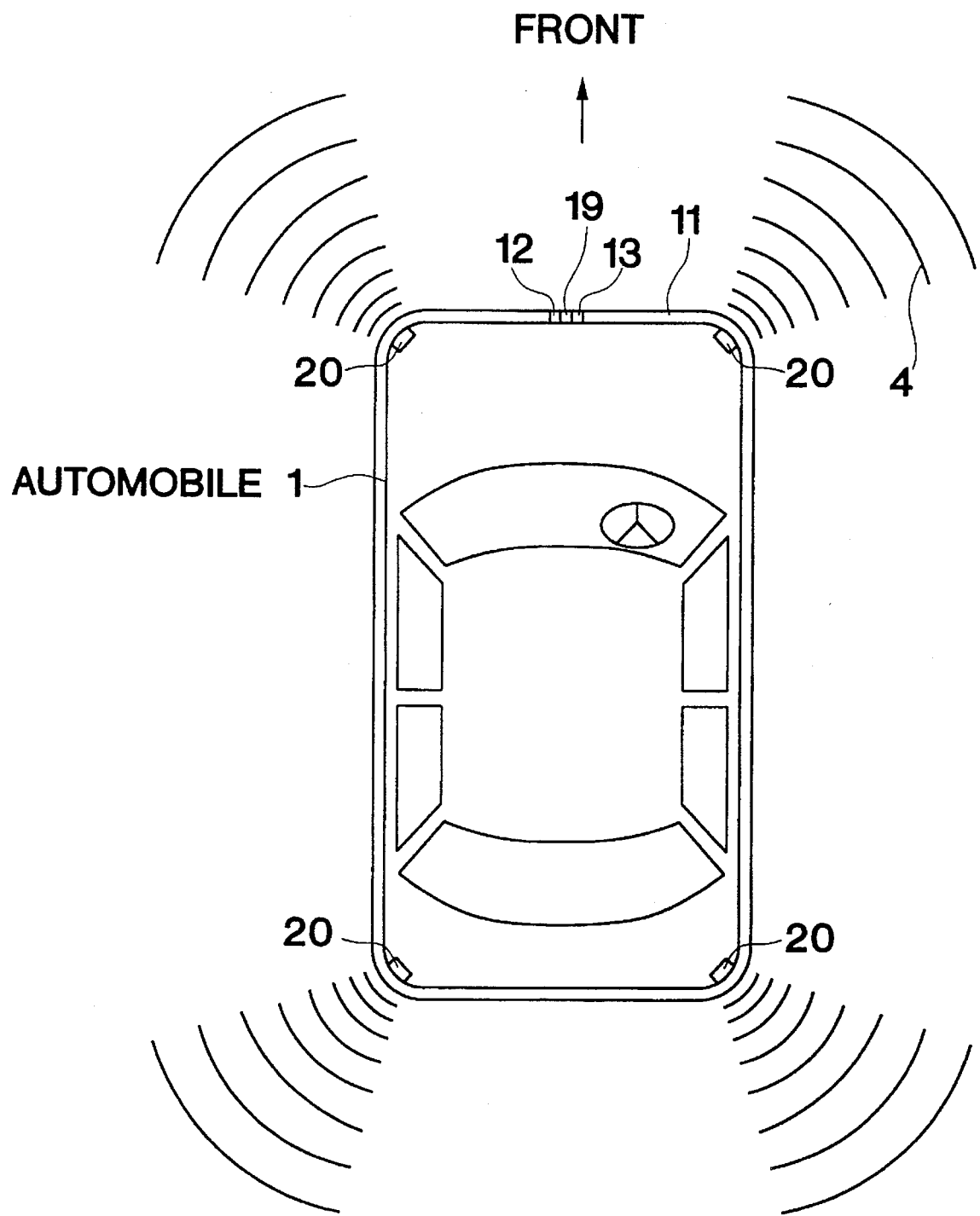
FIG. 4 is a schematic view showing a first embodiment of automobile to which the obstacle detection apparatus of the present invention is applied.

A first embodiment of obstacle detection apparatus of the present invention applied to an automobile will be described with reference to FIGS. 4 to 7. As shown in FIG. 4, the elongated rubber-like elastic body 11 of the same shape as a body molding is provided continuously on the entire periphery over the front, rear, right and left surfaces of the automobile 1 so that it also functions as a molding, and the electrodes 12 and 13 are connected to the conversion circuit 15. The numeral 19 indicates the insulating material between the electrodes 12 and 13. Furthermore, ultrasonic wave transmitters 20 are attached to the four individual corner parts of the automobile 1 so that the ultrasonic wave 4 is transmitted outward radially.

Figure 5:
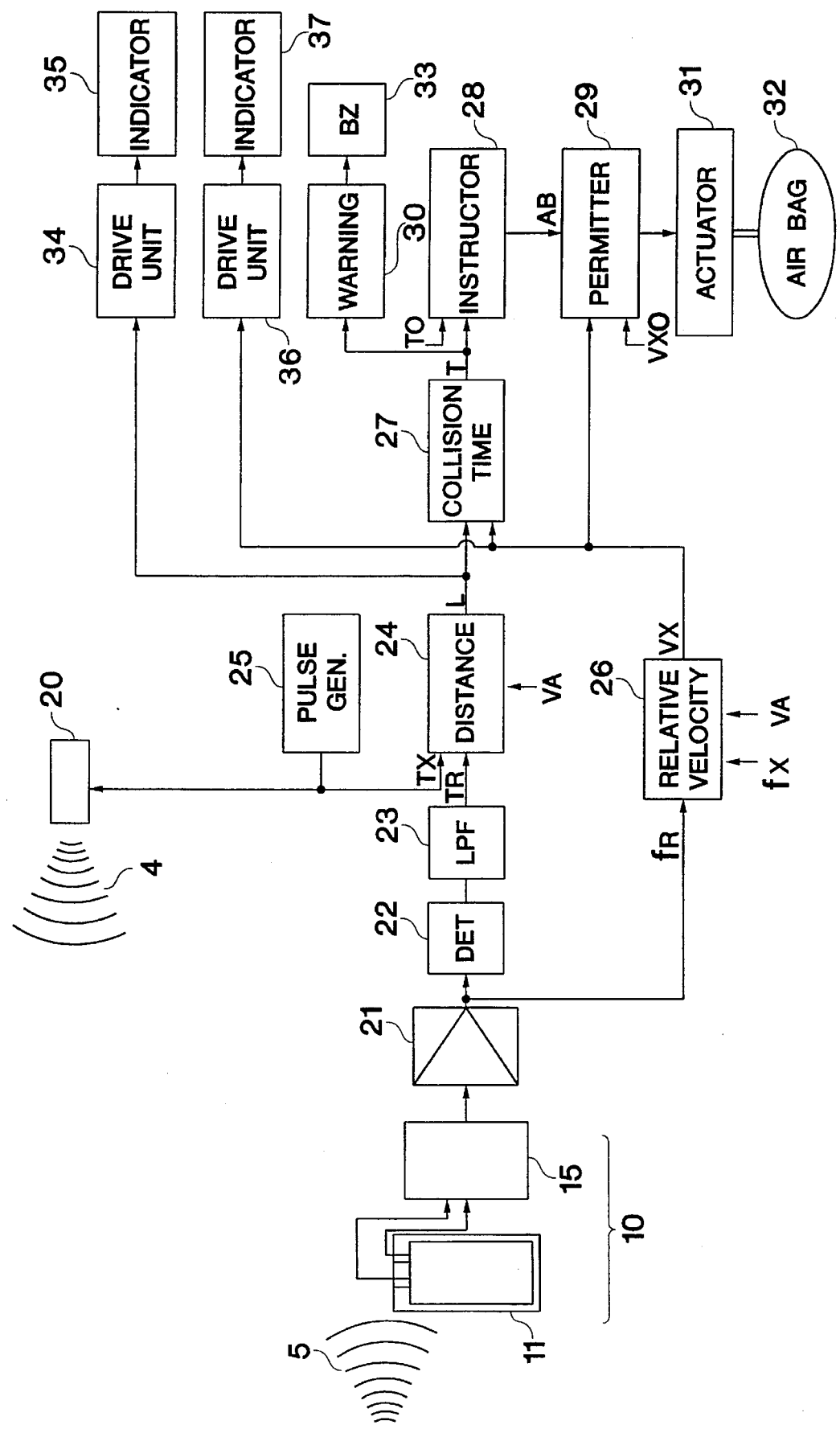
FIG. 5 is diagram showing the circuit construction of the first embodiment of the obstacle detection apparatus.

FIG. 5 shows an example of circuit structure. In FIG. 5, the numeral 21 indicates an amplifier, the numeral 22 indicates a detector, the numeral 23 indicates a low-pass filter, the numeral 24 indicates a distance calculator, the numeral 25 indicates a pulse generator, the numeral 26 indicates a relative velocity calculator, the numeral 27 indicates a collision time calculator, the numeral 28 indicates an air bag operation instructor, the numeral 29 indicates an air bag operation permitter, the numeral 30 indicates a warning device, the numeral 31 indicates an actuator, the numeral 32 indicates an air bag, and the numeral 33 indicates a buzzer. Of these devices, the individual devices 24 to 30 each comprise a microcomputer. The functions will be described below.

The ultrasonic wave transmitter 20 transmits the ultrasonic wave 4 of a preset frequency intermittently for a preselected time every time the pulse generator 25 generates a pulse. When the ultrasonic wave receiver 10 receives a reflection wave 5, the reception signal is amplified by the amplifier 21, detected by the detector 22, and passed through the low-pass filter 23 to be shaped to a reception pulse signal. Using a time difference (TR−TX) between an input time TR of the reception pulse signal and a pulse output time TX of the pulse generator 25 and a sound velocity VA, the distance calculator 24 calculates a distance L between the automobile and the obstacle as $$L = VA \cdot (TR - TX)/2.$$

The reception signal of the ultrasonic wave receiver 10 is also inputted to the relative velocity calculator 26 through the amplifier 21, where a frequency fR of the reception signal is detected. Using a frequency difference (fR−fX) from a previously known frequency fX of the transmitted ultrasonic wave 4 and the sound velocity VA, a relative velocity VX between the automobile and the obstacle is calculated as $$VX = VA \cdot (fR - fX)(2 \cdot fR).$$

A positive relative velocity VX indicates that the obstacle is approaching.

The collision time calculator 27 calculates a time of collision of the automobile with the obstacle if the current condition continues, from the distance L and the relative velocity VX according to T=L/VX. Of course, this is equivalent to $$T = (TR - TX) \cdot fR/(fR - fX).$$

Figure 6:
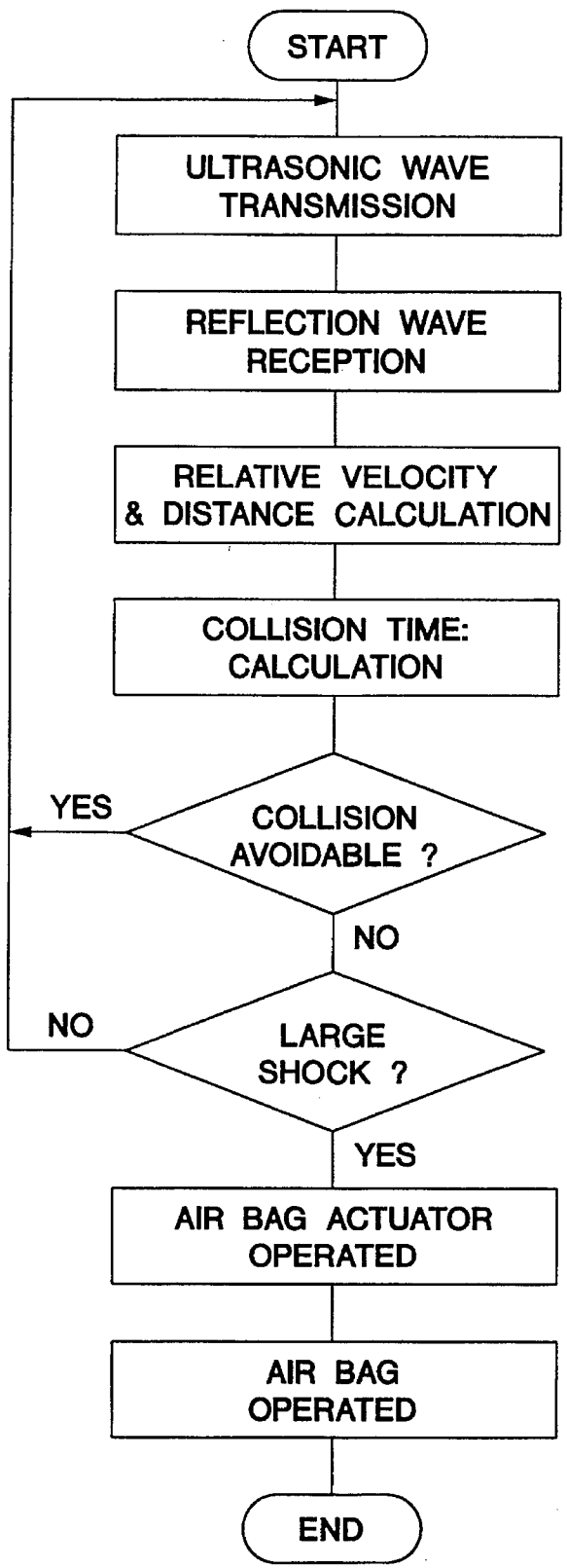
FIG. 6 is a flow chart showing operation of the obstacle detection apparatus.

The air bag operation instructor 28 compares a predetermined time To with the collision time T and, when $0 \leq T \leq To$, outputs an air bag operation instruction AB to operate the air bag 32 by the actuator 31. The above series of operation flow is shown in FIG. 6. However, the operation of the air bag 32 is allowed only when the air bag operation permitter 29 compares a predetermined velocity VXo with the relative velocity VX and $VX \geq VXo$, but inhibited when VX<VXo.

The warning device 30, in order to notify the passenger of the condition before the air bag operation, divides the collision time into a plurality of intervals or segments in length to sound the buzzer 33 stepwise with a higher tone for a shorter collision time T. However, when T is sufficiently long, the buzzer 33 is not sounded. In addition, using a distance indicator 35 and a relative velocity indicator 37 and their drivers 34 and 36, the value of distance L and the magnitude of the relative velocity VX are divided into a plurality of segments or levels to notify the passenger of the distance and the relative velocity with different indication colors.

Figure 7:
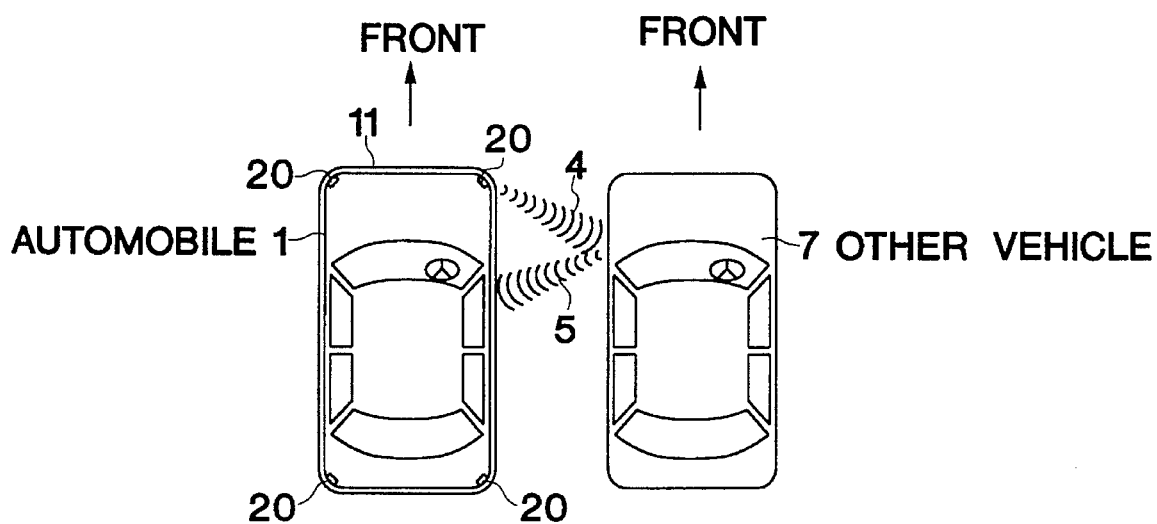
FIG. 7(a) is a schematic view showing a condition where the vehicle and an obstacle are traveling side by side.
FIG. 7(b) is a schematic view showing a condition where an obstacle is about to collide with the side of the vehicle.
Figure 7:
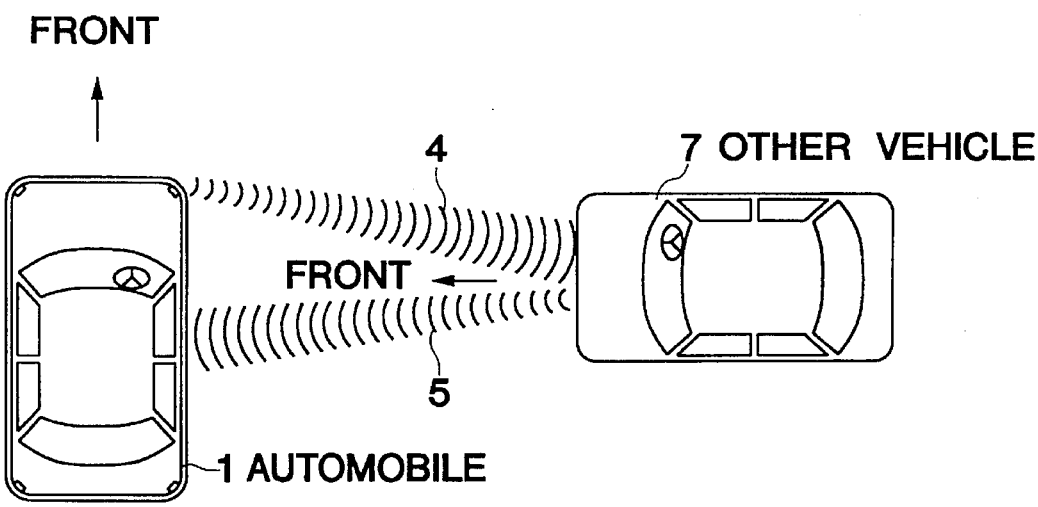

With the above-described air bag operation control, when the automobile 1 and the other vehicle 7 are traveling side by side as shown in FIG. 7(*a*), the relative velocity is nearly zero and there is no danger even if both vehicles are close to each other, and the air bag is not opened. However, when an obstacle such as the other vehicle 7 is traveling from the side as shown in FIG. 7(*b*), there is a danger of collision even if there is a distance, and the condition is foreseen to open the air bag beforehand, thereby saving a life. Of course, if the collision time T is short, the air bag is opened beforehand even if the obstacle such as the other vehicle 7 is in front, back, or in an angled direction. In general, the air bag for lateral collision will not serve the purpose if it opens after collision. The first embodiment is described for a structure in which the rubber-like elastic body also functions as a molding. However, the rubber-like elastic body may also be attached to an existing molding by an adhesive or the like, or provided on the vehicle body surface separately from the molding, with no problem. Furthermore, a single non-directional transmitter 20 may be mounted on the roof.

A second embodiment of the obstacle detection apparatus according to the present invention will now be described.

Figure 8:
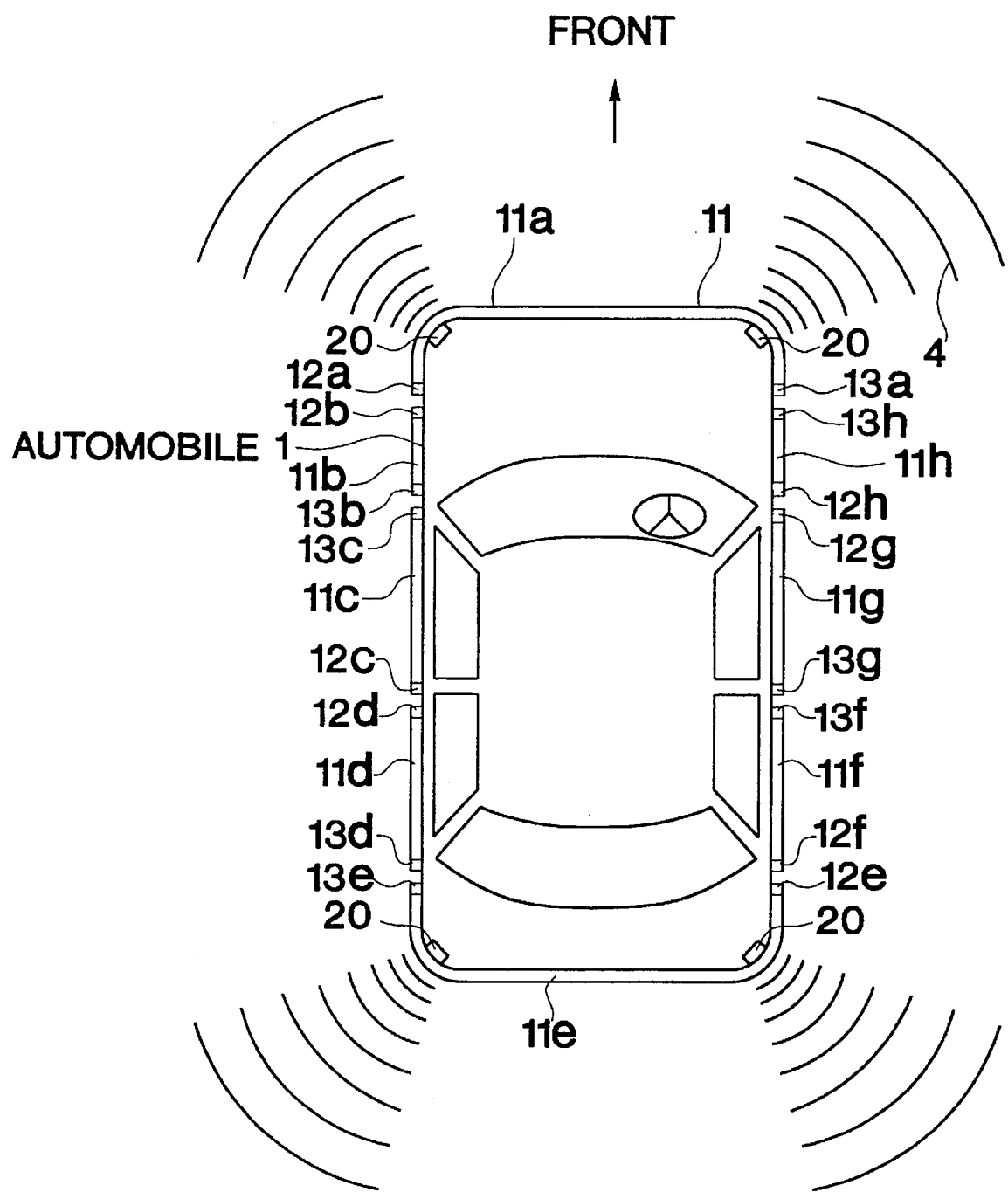
FIG. 8 is a schematic view showing a second embodiment of automobile to which the obstacle detection apparatus of the present invention is applied.

As shown in FIG. 8, elongated, divided rubber-like elastic bodies 11*a* to 11*h* of the same shape as the molding are provided on the front and rear bumpers, right and left side surfaces, and the individual doors of the vehicle to function also as moldings. Electrodes 12*a* to 12*h* and 13*a* to 13*h* are connected to the individual conversion circuits 15*a* to 15*h*, and independently applied with voltages. The individual electrodes 12*a* to 12*h* and 13*a* to 13*h* are insulated from adjacent electrodes by insulating materials or spaces. Furthermore, the ultrasonic wave transmitters 20 are attached to the four individual corner parts of the automobile 1 so that the ultrasonic wave 4 is transmitted outward radially.

Figure 9:
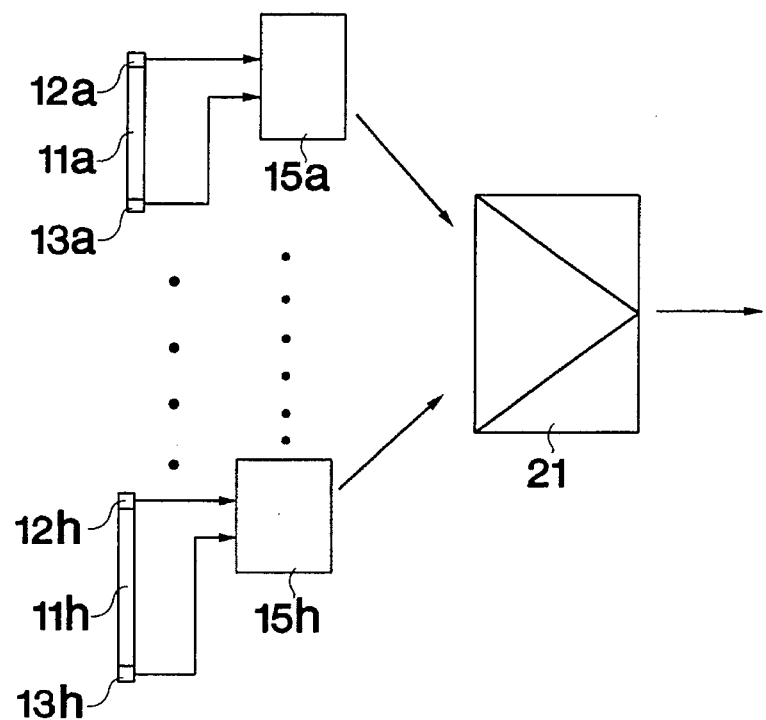
FIG. 9 is diagram showing the circuit construction of the second embodiment of the obstacle detection apparatus.
Figure 15:
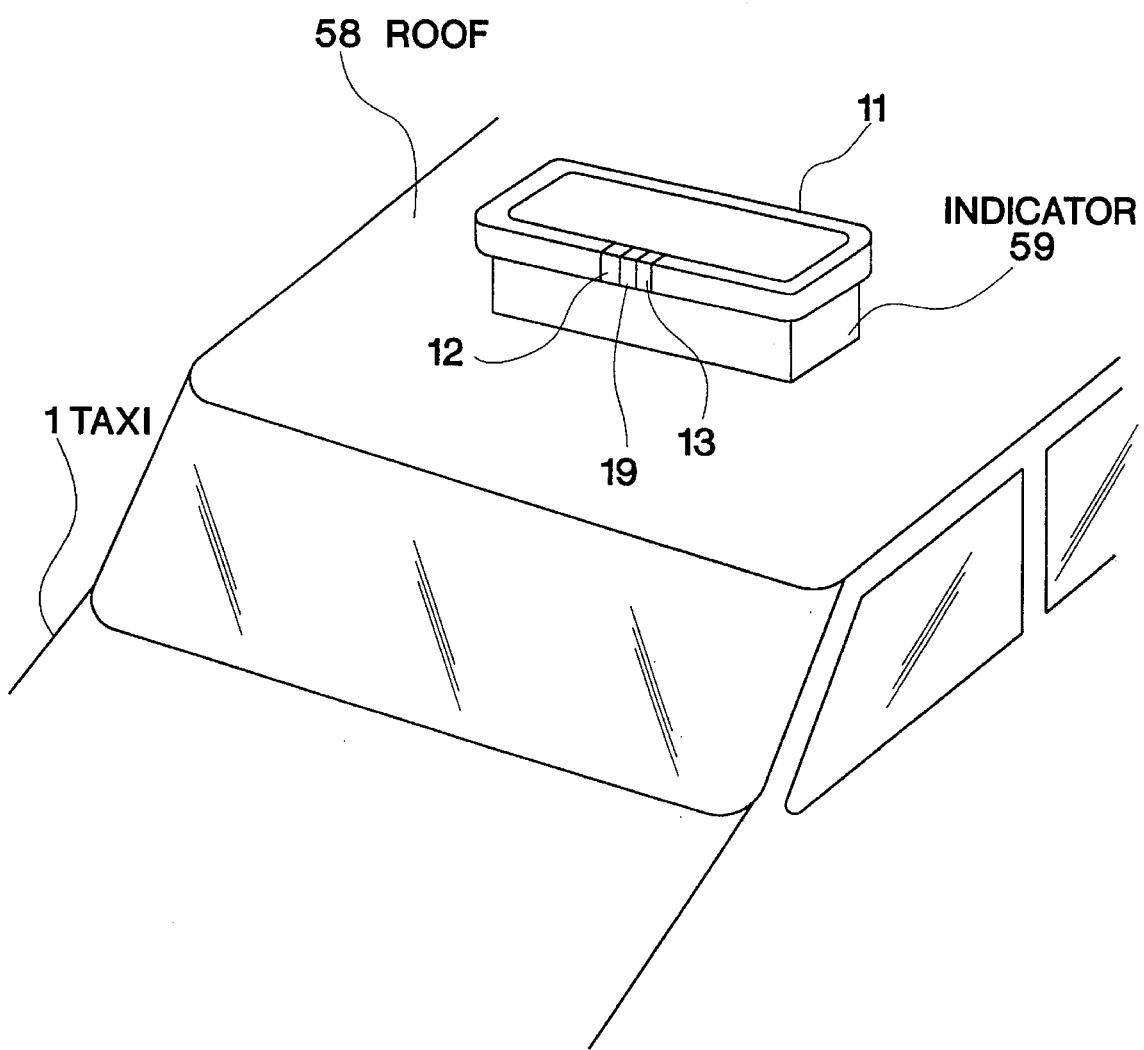
FIG. 15 is a schematic view showing a further embodiment wherein the rubber-like elastic body is mounted to an indicator on the roof.

The circuit construction is common for the portion after the amplifier 21 as shown in FIG. 5 and, as shown in FIG. 9, the individual outputs of the conversion circuits 15*a* to 15*h* connected with the electrodes 12*a* to 12*h* and 13*a* to 13*h* of the individual rubber-like elastic bodies 11*a* to 11*h* are inputted in parallel to the amplifier 21. Of course, the rubber-like elastic bodies may be connected in series. The operation is the same as described in the first embodiment. Also in this case, the rubber-like elastic bodies may be attached to existing moldings, or attached to the vehicle body surface separately from the moldings, with no problem. For example, as shown in FIG. 15, the rubber-like elastic body 11 may be attached to an indicator 59 provided on a roof 58 of a taxi or the like. A single transmitter 20 of a non-directional type may be provided on the roof with no problem.

A third embodiment of the obstacle detection apparatus according to the present invention will now be described.

Figure 10:
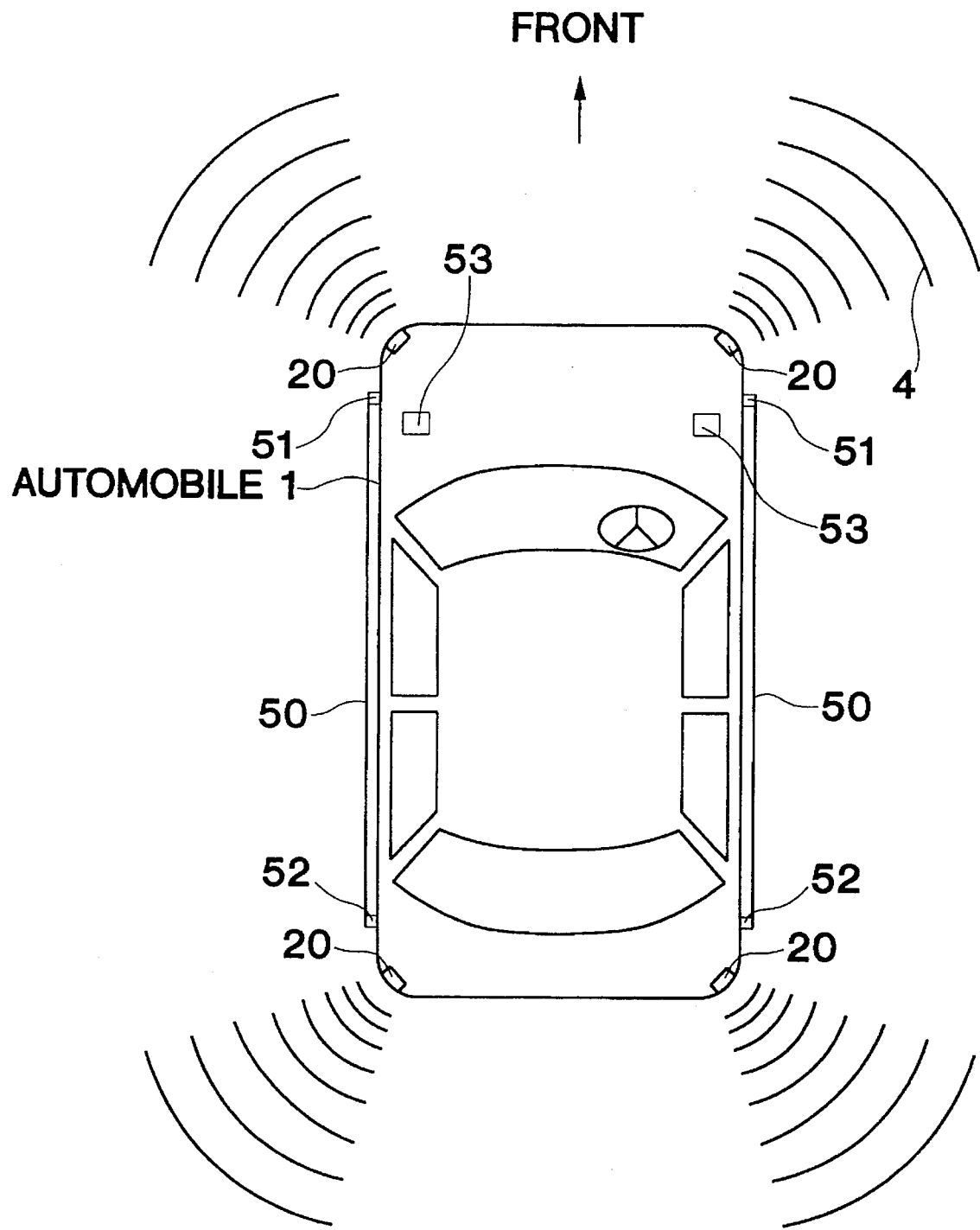
FIG. 10 is a schematic view showing a third embodiment of automobile to which the obstacle detection apparatus of the present invention is applied.

As shown in FIG. 10, side protect moldings 50 formed of the rubber-like elastic body interspersed with electroconductive particles are mounted on the right and left side surfaces of the automobile 1, and electrodes 51 and 52 are connected to conversion circuits 53. Furthermore, ultrasonic wave transmitters 20 are mounted to the individual four corner parts of the automobile 1 so that the ultrasonic wave 4 is transmitted outward radially. The circuit construction is common for the portion after the amplifier 21 as shown in FIG. 5, and outputs of the conversion circuits 53 connected with the electrodes 51 and 52 of the individual side protect moldings 50 are inputted in parallel to the amplifier 21. Of course, the individual side protect moldings may be electrically connected in series. The operation is the same as described ion the first embodiment. A single transmitter 20 of a non-directional type may be provided on the roof with no problem.

Further, a fourth embodiment of the obstacle detection apparatus according to the present invention will be described.

Figure 11:
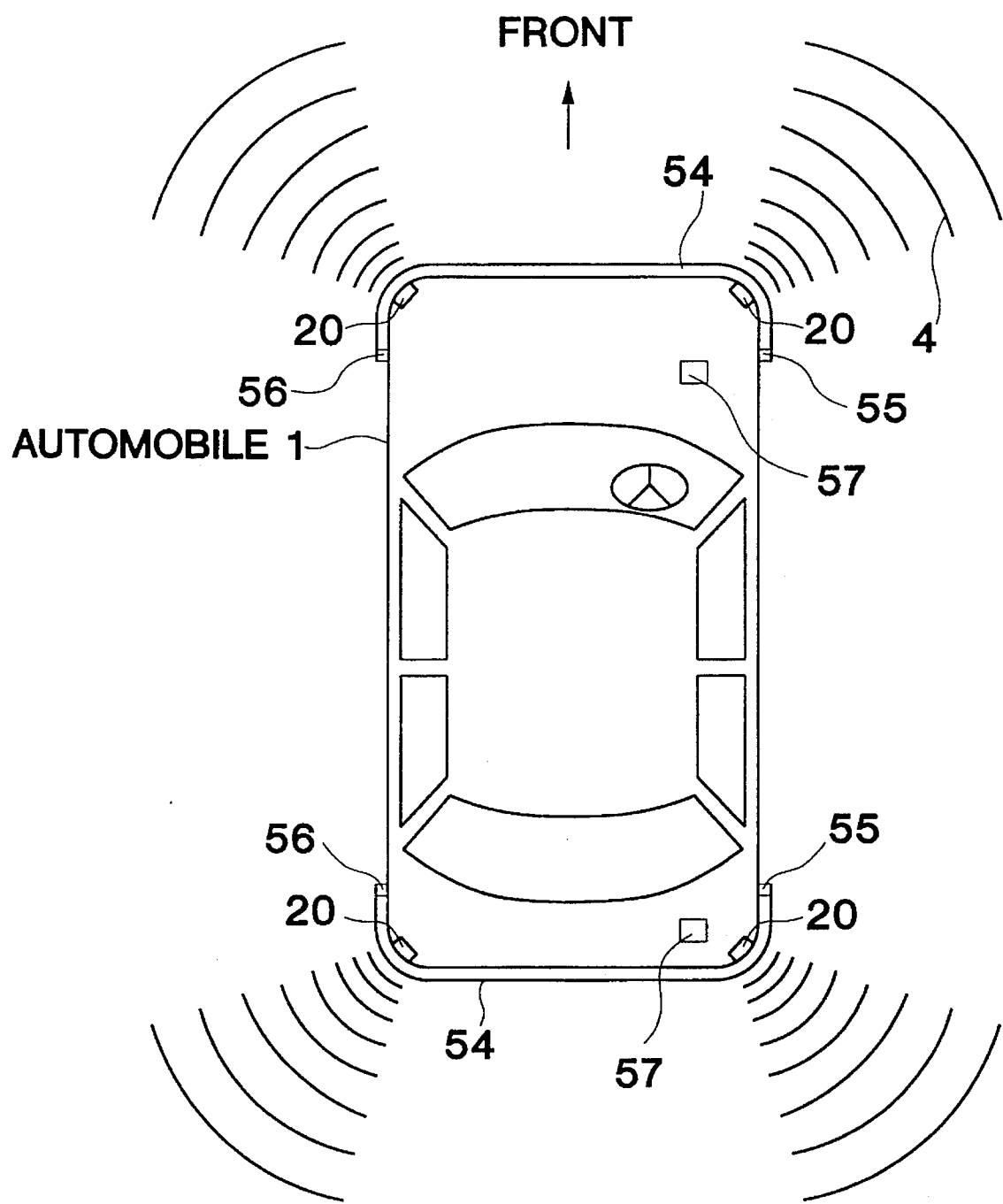
FIG. 11 is a schematic view showing a fourth embodiment of automobile to which the obstacle detection apparatus of the present invention is applied.
Figure 13:
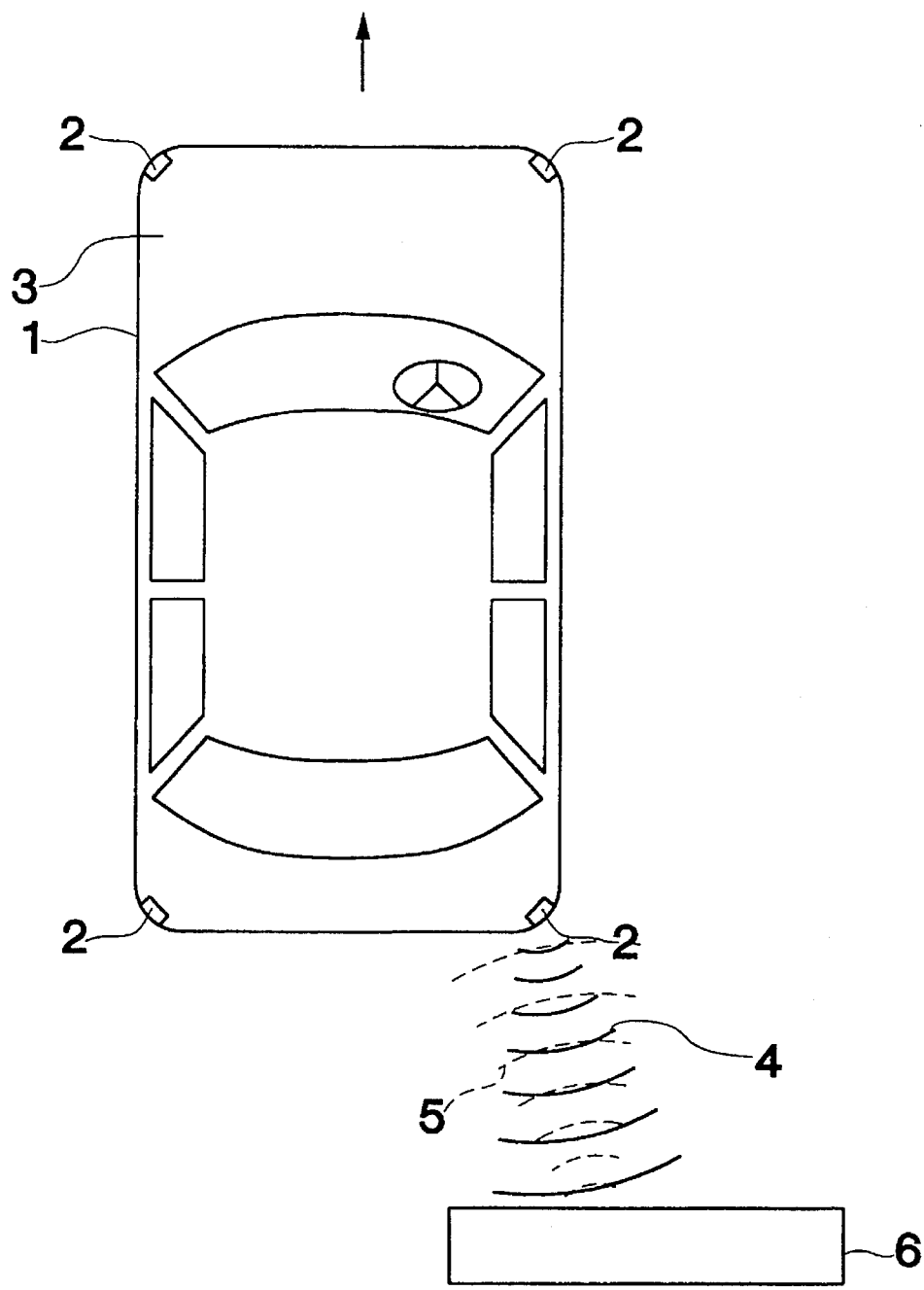
FIG. 13 is a schematic view of a prior art obstacle detection apparatus.
Figure 14:
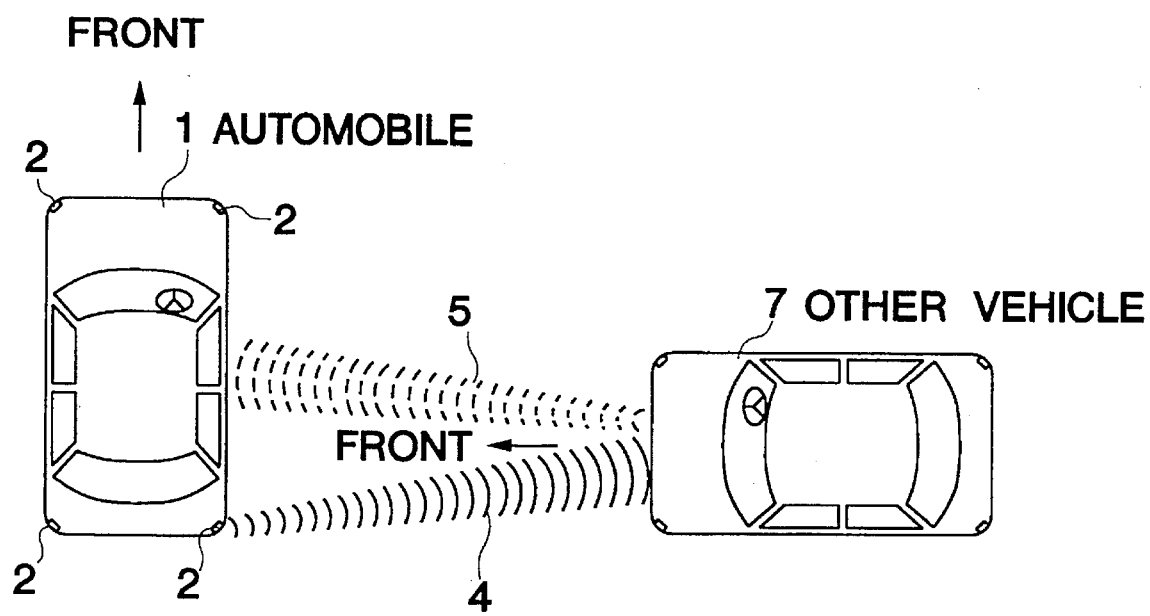
FIG. 14 is a schematic view showing a prior art problem.

As shown in FIG. 11, front and rear bumpers having bumper moldings 54 formed of the rubber-like elastic body interspersed with electroconductive particles are mounted on the front and rear of the automobile 1, and electrodes 55 and 56 are connected to conversion circuits 57. Furthermore, ultrasonic wave transmitters 20 are mounted to the individual four corner parts of the automobile 1 so that the ultrasonic wave 4 is transmitted outward radially. The circuit construction is common for the portion after the amplifier 21 as shown in FIG. 5, and outputs of the conversion circuits 57 connected with the electrodes 55 and 56 of the individual bumper moldings 54 are inputted in parallel to the amplifier 21. Of course, the individual bumper moldings may be electrically connected in series. The operation is the same as described in the first embodiment. A single transmitter 20 of a non-directional type may be provided on the roof with no problem.

Figure 12:
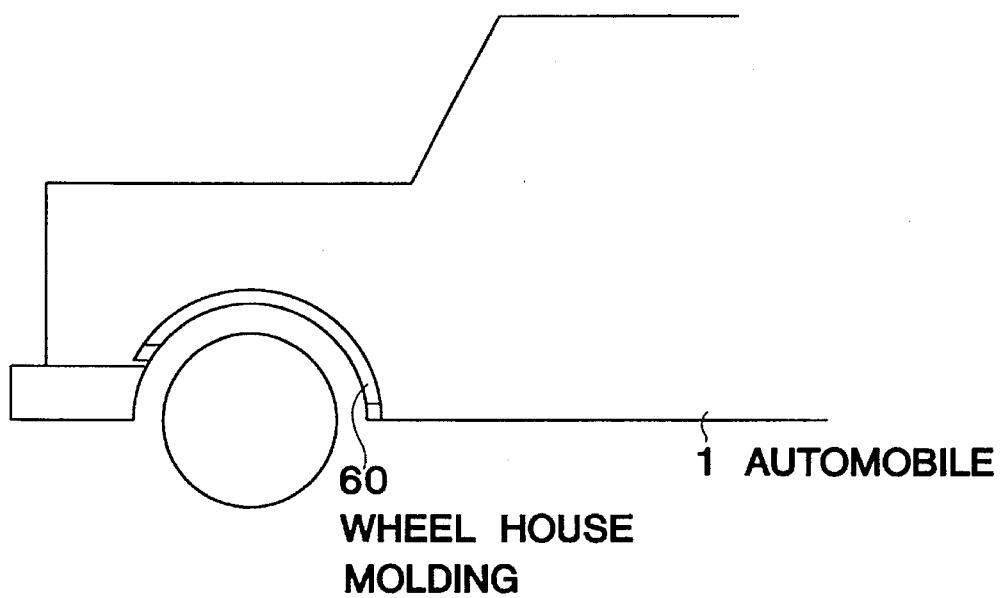
FIG. 12 is a schematic view showing a wheel house molding formed of the rubber-like elastic body.

The individual moldings formed of the rubber-like elastic body described in the third and fourth embodiments may be appropriate ones which are attached to the vehicle body, and may be used for wheel house moldings 60 as shown in FIG. 12, for example. Needless to say, the attached individual moldings may be electrically connected in series or parallel. In this case, the portion after the amplifier 21 may be a single unit.

We claim:

1. An ultrasonic wave reception apparatus comprising:

an elastic body interspersed with electroconductive particles, for receiving an ultrasonic wave; and detecting means, operatively connected to the elastic body, for detecting reception of the ultrasonic wave, including, first means for applying a voltage to said elastic body, and second means for detecting an ultrasonic wave reception signal, indicating reception of the ultrasonic wave, produced from a change in electrical resistance of said elastic body.

2. The ultrasonic wave reception apparatus as claimed in claim 1, further comprising a support member for said elastic body, wherein said elastic body is provided along substantially the entire periphery of said support member.

3. The ultrasonic wave reception apparatus as claimed in claim 1, wherein the electroconductive particles are carbon and are contained in 25 to 60% by weight of the elastic body, based on a total weight of said elastic body.

4. The ultrasonic wave reception apparatus as claimed in claim 1, wherein the electroconductive particles are short carbon short fibers 0.01 to 0.02 mm in diameter and less than 1 mm in length.

5. The ultrasonic wave reception apparatus as claimed in claim 1, wherein the electroconductive particles are carbon particles, 0.01 to 0.1 mm in diameter.

6. An obstacle detection apparatus comprising:

a support member;

an ultrasonic wave transmission apparatus mounted on said support member for transmitting an ultrasonic wave;

an elastic body interspersed with electroconductive particles provided along an outer surface of said support member, for receiving an ultrasonic wave which is transmitted from said ultrasonic wave transmission apparatus and reflected by a remote object;

a conversion circuit for applying a voltage to said elastic body and for obtaining an ultrasonic wave reception signal, indicating reception of the ultrasonic wave, from a change in electrical resistance of said elastic body; and distance calculation means, connected to said ultrasonic wave transmission apparatus and said conversion circuit, for calculating a distance between said support member and said remote object off which the transmitted ultrasonic wave is reflected, from a difference between a time at which the ultrasonic wave is transmitted from said ultrasonic wave transmission apparatus and a time at which the ultrasonic wave reflected by the remote object is received by said elastic body.

7. The obstacle detection apparatus as claimed in claim 6, further comprising:

relative velocity calculation means, operatively connected to the conversion circuit, for calculating a relative velocity between said support member and the remote object from a difference in frequency between the ultrasonic wave transmitted from said transmission apparatus and the ultrasonic wave reflected by the remote object and received by said elastic body; and collision time calculation means, operatively connected to the distance calculation means and the relative velocity calculation means, for calculating a time until collision between said support member and the remote object from the calculated relative velocity and the distance calculated by said distance calculation means.

8. An obstacle detection apparatus comprising:

an ultrasonic wave transmission apparatus mounted on a vehicle for transmitting an ultrasonic wave outward;

an elastic body interspersed with electroconductive particles provided on an outer surface of the vehicle, for receiving an ultrasonic wave which is transmitted from said ultrasonic wave transmission apparatus and reflected by a remote object;

a conversion circuit for applying a voltage to said elastic body and for obtaining an ultrasonic wave reception signal, indicating reception of the ultrasonic wave, from a change in electrical resistance of said elastic body; and distance calculation means, connected to said ultrasonic wave transmission apparatus and said conversion circuit, for calculating a distance between said vehicle and said remote object off which the transmitted ultrasonic wave is reflected, from a difference between a time at which the ultrasonic wave is transmitted from said ultrasonic wave transmission apparatus and a time at which the ultrasonic wave reflected by the remote object is received by said elastic body.

9. The obstacle detection apparatus as claimed in claim 8, further comprising:

relative velocity calculation means, operatively connected to the conversion circuit, for calculating a relative velocity between said vehicle and the remote object from a difference in frequency between the ultrasonic wave transmitted from said transmission apparatus and the ultrasonic wave reflected by the remote object and received by said elastic body; and collision time calculation means, operatively connected to the distance calculation means and the relative velocity calculation means, for calculating a time until collision between said vehicle and the remote object from the calculated relative velocity and the distance calculated by said distance calculation means.

10. The obstacle detection apparatus as claimed in claim 9, further comprising:

air bag operation instruction means, operatively connected to the collision time calculation means, for operating an air bag, associated with the vehicle, when the time until collision, calculated by said collision time calculation means, is less than a predetermined value.

11. The obstacle detection apparatus as claimed in claim 9, further comprising:

air bag operation permission means, operatively connected to the relative velocity calculation means and the air bag instruction means, for permitting operation of an air bag, associated with the vehicle, only when the calculated relative velocity is greater than a predetermined velocity value.

12. The obstacle detection apparatus as claimed in claim 9, further comprising:

warning means, operatively connected to the collision time calculation means, for providing a warning of a potential collision between the vehicle and the remote object, wherein the providing of the warning is varied in form in relation to the calculated time of potential collision.

13. The obstacle detection apparatus as claimed in claim 8, wherein said elastic body is provided over the entire periphery of the outer surface of the vehicle.

14. The obstacle detection apparatus as claimed in claim 8, wherein said elastic body is provided on a predetermined portion of the outer surface of the vehicle.

15. The obstacle detection apparatus as claimed in claim 14, wherein said predetermined portion includes at least one of front and rear bumpers, doors, wheel arches, fenders, and body panels of the vehicle.

16. The obstacle detection apparatus as claimed in claim 14, wherein said elastic body includes a plurality of elastic body portions electrically connected in series.

17. The obstacle detection apparatus as claimed in claim 14, wherein said elastic body includes a plurality of elastic body portions electrically connected in parallel.

18. The obstacle detection apparatus as claimed in claim 8, wherein said elastic body is attached to an indicator provided on a roof of the vehicle body.

19. The obstacle detection apparatus as claimed in claim 8, wherein said ultrasonic wave transmission apparatus includes a plurality of individual transmitters, located at four corner parts of the vehicle.

20. The obstacle detection apparatus as claimed in claim 8, wherein said ultrasonic wave transmission apparatus includes a single transmitter, located on the roof of the vehicle.

21. The obstacle detection apparatus as claimed in claim 8, wherein said elastic body includes a molding attached to the vehicle.

22. An obstacle detection apparatus comprising:

an ultrasonic wave transmission apparatus mounted on a vehicle for transmitting an ultrasonic wave outward;

a molding formed of an elastic body interspersed with electroconductive particles, attached to the vehicle, for receiving the transmitted ultrasonic wave; and a conversion circuit for applying a voltage to said elastic body of the molding and for obtaining an ultrasonic wave reception signal, indicating reception of the transmitted wave, from a change in electrical resistance of said elastic body.

23. The obstacle detection apparatus as claimed in claim 22, wherein said molding is a side protect molding of the vehicle.

24. The obstacle detection apparatus as claimed in claim 22, wherein said molding is a bumper molding of the vehicle.

25. The obstacle detection apparatus as claimed in claim 11, further comprising:

air bag operation instruction means, operatively connected to the collision time calculation means, for operating the air bag, when the calculated time until collision is less than a predetermined value and when the calculated relative velocity is greater than the predetermined velocity value.

26. An obstacle detection apparatus, comprising:

an ultrasonic wave transmitter, mounted on a vehicle, for transmitting ultrasonic wave signals outward;

an elastic member, provided on an outer surface of the vehicle, interspersed with electroconductive particles, for receiving the transmitted ultrasonic wave signals; and a conversion circuit, operatively connected to the elastic member, for applying an electrical signal of a predetermined reference level to the elastic member, and for detecting an electrical signal varying from the predetermined reference level corresponding to the received ultrasonic wave signals.

27. The ultrasonic wave reception apparatus of claim 26, wherein the detected electrical signal varies in proportion to variations in electrical resistance characteristics of the elastic member.

28. The ultrasonic wave reception apparatus of claim 27, wherein the ultrasonic wave signals received by the elastic member causes the detected electrical signal to vibrate about the predetermined reference level.

29. The ultrasonic wave reception apparatus of claim 28, wherein the received ultrasonic wave signals cause the electrical resistance characteristics of the elastic member to vary.

30. The obstacle detection apparatus as claimed in claim 26, further comprising:

distance calculation means, operatively connected to the ultrasonic wave transmitter and the second means, for calculating a distance between said vehicle and a remote object off which the transmitted ultrasonic wave signal is reflected, from a difference between a time at which the ultrasonic wave signal is transmitted from said ultrasonic wave transmitter and a time at which the ultrasonic wave signal reflected by the remote object is received by said elastic member.

31. The obstacle detection apparatus as claimed in claim 30, further comprising:

relative velocity calculation means, operatively connected to the second means, for calculating a relative velocity between said vehicle and the remote object, from a different in frequency between the ultrasonic wave signal transmitted from said transmitter and the ultrasonic wave signal reflected by the remote object and received by said elastic member; and collision time calculation means, operatively connected to the distance calculation means and the relative velocity calculation means, for calculating a time until collision between said vehicle and the remote object from the calculated relative velocity and the distance calculated by said distance calculation means.

32. The obstacle detection apparatus as claimed in claim 31, further comprising:

air bag operation instruction means, operatively connected to the collision time calculation means, for operating an air bag, associated with the vehicle, when the time until collision, calculated by said collision time calculation means, is less than a predetermined value.

33. The obstacle detection apparatus as claimed in claim 31, further comprising:

air bag operation permission means, operatively connected to the relative velocity calculation means and the air bag instruction means, for permitting operation of an air bag, associated with the vehicle, only when the calculated relative velocity is greater than a predetermined velocity value.

34. The obstacle detection apparatus as claimed in claim 31, further comprising:

warning means, operatively connected to the collision time calculation means, for providing a warning of a potential collision between the vehicle and the remote object, wherein the providing of the warning is varied in form in relation to the calculated time of the potential collision.

35. The obstacle detection apparatus as claimed in claim 33, further comprising:

an air bag operation instruction means, operatively connected to the collision time calculation means, for operating the air bag, when the calculated time until collision is less than a predetermined value and when the calculated relative velocity is greater than the predetermined velocity value.

36. An ultrasonic wave reception apparatus, comprising:

an elastic member, interspersed with electroconductive particles, receiving ultrasonic wave signals, the received ultrasonic wave signals changing electrical resistance characteristics of the elastic member;

voltage source, operatively connected to the elastic member, supplying a reference voltage to the elastic member; and detector, operatively connected to the elastic member, for detecting the received ultrasonic wave signals from variations in voltage from the reference voltage, the variations being caused by changes in the electrical resistance characteristics of the elastic member.

37. An ultrasonic wave reception apparatus, comprising:

an elastic member, interspersed with electroconductive particles, for receiving ultrasonic wave signals; and a conversion circuit, operatively connected to the elastic member, for applying an electrical signal of a predetermined reference level to the elastic member, and for detecting the received ultrasonic wave signals from a detected electrical signal varying from the predetermined reference level.

38. The ultrasonic wave reception apparatus of claim 37, wherein the detected electrical signal varies from the predetermined reference level in response to variations in electrical resistance characteristics of the elastic member.

39. The ultrasonic wave reception apparatus of claim 38, wherein the detected electrical signal is a detected voltage varying from a voltage of a predetermined reference level in response to received ultrasonic wave signals.

40. The ultrasonic wave reception apparatus of claim 39, wherein the received ultrasonic wave signals cause the electrical resistance characteristics of the elastic member to vary.

* * * * *